United States Patent [19]

Okabe

[11] Patent Number: 4,520,058
[45] Date of Patent: May 28, 1985

[54] METHOD FOR PRODUCING LEATHER FIBROUS TISSUES PLANTED ON A BASIC CLOTHING SHEET AND SHEET PRODUCTS PRODUCED THEREBY

[76] Inventor: Yoshiro Okabe, 6-12-19, KamiHigashi, Hirano-ku, Osaka, Japan

[21] Appl. No.: 485,637

[22] Filed: Apr. 18, 1983

[51] Int. Cl.³ .............................................. B05D 1/16
[52] U.S. Cl. ...................................... 428/90; 427/206; 428/473
[58] Field of Search ................... 241/23; 427/26, 206; 428/90, 473

[56] References Cited

U.S. PATENT DOCUMENTS 3,978,179  8/1976  Sundhauss ........................ 241/24 X
4,288,498  9/1981  Scribner ............................ 241/23 X

FOREIGN PATENT DOCUMENTS 364598  7/1930  United Kingdom ................ 427/206
551797  3/1943  United Kingdom ................ 427/206

Primary Examiner—Shrive P. Beck
Attorney, Agent, or Firm—Moonray Kojima

[57] ABSTRACT

This invention is concerned with a novel method for producing leather fibrous tissues in the form of raw material and semi-leather sheets produced by this method wherein odd flocks and other unnecessary fragments of animals' leathers produced subsequent to cutting or shaving operations of the leathers are cut into very short length in dried conditions and then resoluted in water, thereafter being dried up again to form small leather pieces. These pieces are selectively assorted through a filter means and uniformly stuck onto the outer surface area of a suitable basic clothing sheet. The invention further involves the construction of semi-leather sheet products produced by this method, which are far superior in heat-resisting, moisture-absorbent and releasing properties to the conventional semi-leather sheet products now on the market.

6 Claims, 5 Drawing Figures

METHOD FOR PRODUCING LEATHER FIBROUS TISSUES PLANTED ON A BASIC CLOTHING SHEET AND SHEET PRODUCTS PRODUCED THEREBY

BACKGROUND OF THE INVENTION

The present invention is generally related to a method for producing semi-leather fibrous tissue sheets, and more particularly to provision of the choice of raw material composed of short-cut animals' leather pieces so as to produce semi-leather sheet products such as what is called "backskin" sheet, by planting these pieces on a woven or unwoven basic clothing sheet in uniformly and inseparably attached relation to the outside surface area of the sheet. Thus are finished sheet products reproducing animals' leather sheets most similar to the original leather of animals' skin.

With a view to artificially reproducing leather sheets similar to animals' leather there have been practically applied such well known method in the field of skilled arts for example as of cutting animals' leather into short length and resoluting the cut amount thereof.

However, as in shown in FIG. 1(A) of the accompanying drawings, most of the artificially finished leather fabric tissues 1 produced by the conventional method are, as the whole, doomed to be curled and frizzled unexceptionally to excess because each of tissues 1 or fiber elements cannot but be accompanied with a number of bristles and sprays or twigs 1a. Thus in case of planting these tissues 1 on a basic clothing sheet 2 by means of a binder 3 with respect to FIG. 1(B), there is no expectation to plant uniformly on the basic clothing sheet 2 almost equal number of tissues, differently from any natural or animals' fiber elements 1. Also it is infeasible to plant a pre-determined number of the conventional fibers on the basic clothing sheet 2 per fixed surface area, thus resulting in the fibers having some portions densely planted while other portions are thinly planted. Moreover, due to the structurally curled and frizzled conditions of the existing fibrous tissues, an extremity of each fiber element cannot be fully pierced into adhesive layer of the basic clothing sheet 2; wherein some fiber elements are left, at the midway thereof, stuck to the basic clothing sheet 2, thus giving rise to a difficulty that desired planting effeciency cannot be secured.

As has been mentioned in the foregoing description, even if animals' leather fibrous tissues are to be carefully planted or pierced onto the basic clothing sheet 2 in accordance with the conventional manufacturing methods, the leather fibrous tissues thus produced are still essentially short of piercing power. As a result the sensitive tone of slipperiness peculiar to animals' leather fibrous tissues themselves cannot be reproduced on the basic clothing sheet 2 when baffing operations are applied thereto since, during the course of this operation, a number of fibrous tissues entangled or twisted with each other are forcibly to come off the basic clothing sheet 2 by baffing power which is repeatedly and unavoidably added to the entangled or twisted force of the planted fiber elements per se.

Furthermore, referring to the conventional semi-leather fibrous tissue sheets, it is technically impossible to plant these tissues or fiber element 1 on the basic clothing sheet 2 through the whole surface area thereof, consequently bringing about disadvantages that the products thus finished are inferior to animals' leather sheet products with respect to strength and durability in practical use. In addition thereto, when the planted tissues 1 are dyed either from men's sense of beautiful color or in obedience to any color of animals' leather per se, no effect can be reproduced much less of animals' leather colours because the planted fiber elements 1 are inevitably dyed thick on the portions thereof aslant to the basic clothing sheet 2 only, so that, compared with other thin planted portions, the former portions are subjected to different light refrection from the latter portions whereas animals' leathers are reflected uniformly to equal reflection of colour through the whole surface thereof from any angles.

The main reason, among many others, why conventional semi-leather fibrous tissues 1 are fatally curled and frizzled through the course of treating operations is considered to be attributable to neglegence of the most important facts that animals' leathers in the form of a raw material must be cut into short length and a suitable quantity of water be added to said pieces, thereafter being cut or smashed by means of a sharp cutting blade.

In other word, animals' leathers are widely accepted to be good enough to cut them into a short length only without paying attention as to how important it is to add a suitable quantity of water to the amount of cut pieces and select a smashing means for cutting said pieces to further cut the pieces into shorter length. Namely, according to the existing cutting method, the raw material is forcibly cut into short length by tearing off the material by use of cutting instruments having on obtuse blade edge, regardless of the percentage of water contained an the raw material. For a fuller understanding, a maximum elemental unit composing animals' leather fibrous tissues 1 is a bundle which comprises a group of fibers gathering together with each other, in which each of the fibers is composed of plurality of fiber elements having diameters between 4 and 8 microns, respectively, further each of said fiber elements comprising several hundred pieces of fibrils, as are generally well known in the field of skilled art.

In spite of the above-mentioned properties peculiar to animals' leather fibrous tissues 1, the realities are that use is made of such a dull implement as the obtuse knife as has already been referred to in the foregoing description to comminute or smash thereby the animals' leathers into short length of pieces without mixing the former with a suitable quantity of water just when the smashing operation is being carried out. Thus to say nothing of said bundles and said fibers, both the fiber elements and the fibrils that compose the former two and are of by far diametrally smaller elemental components thereof are also directly subjected to the effect of this smashing operation until at last the latter two are broken up; consequently, this quantity of dismantled fibers and fibrils are branched off in free directions to give rise to bristling and branching-off phenomena.

OBJECTS OF THE INVENTION

Accordingly, the present invention has been devised to eradicate all the above-mentioned drawbacks and disadvantages of the existing semi-leather fibrous tissue sheet products, having for one of its main objects the provision of a method for producing a high quality semi-leather sheet goods wherein, in the first place, a sharp cutting blade edge of cutting means is employed to sharply smash an original first raw material so as not to permit each tissue of smashed raw material to be curled and frizzled; in the second place, second raw material produced by smashing said original first raw material is mixed with a suitable quantity of water by means of a mixer in priority to setting the latter material to a mill until the second raw material can be uniformly agitated within said mixer so that an ample quantity of moisture is uniformly bestowed to the second raw material.

In the process of the foregoing smashing and moistening operations, said second raw material which is mixed with water within the mixer before being resolved into a fibrous state by means of the mill is kept on being further mixed until it reaches water content of 50 to 70%; then after the lapse of a fixed length of time it will be found that said percentage of moisture has fully permeated into the fiber elements and the fibrils.

However, the fact with water contained in the fibrous tissues 1 is in generally such that the more the fibrous tissues 1 are, the more powerful the water is liable to be condensed therein and vice versa. Therefore, on the one hand, a quantity of water that has been permeated into both said bundles and said fibrils is less dense in structure of the fibrous tissues and ready to separate said both two from the basic clothing sheet 2. But on the other hand, the other quantity of water that has been permeated into both the fibers and the fibrils is more dense than the preceding two, the result being that the latter two serve to stick to the outer surface area layer of the basic clothing sheet.

For the very foregoing reasons, it is recommended in the present invention that a suitable quantity of water is to be added to the second raw material prior to being resoluted into a fibrous state. In this case, the second raw material may become separable upto a single fiber unit, but said fiber elements and each fibrils still remain inseparable without being subjected to said separability since the permeation of water into the fiber elements and the fibrils has not advanced as yet. Because of the above-mentioned fact, it is considered that there are not caused the fibrous tissue bristling and branching-off phenomena which otherwise go always as in the case with the conventional semi-leather fibrous tissue sheet products.

Another object of the invention is to provide a semi-leather fibrous tissue sheet product wherein, as shown by numeral 4 of FIG. 2(A) of the accompanying drawings and referred thereto in the preceding description of the invention, although some of said fibrous tissues 4 are never excessively curled or frizzled with suitable curvature lengthwise thereof, yet most of other fibrous tissues 4 are formed soft in touch and as the whole in slow curvature almost similar to a straight lineal shape; in addition, each of fibrous tissues 4 being quite free of bristling from the adhesive outer surface area layer of the basic clothing sheet 2 thereby to reproduce a semi-leather fibrous tissues uniformly planted with an animals' leather fibers throughout the whole surface area of the basic clothing sheet 2.

A further object of the invention is to provide a semi-leather fibrous tissue sheet product wherein use is made of said tissues 4 to inseparably plant the same on the basic clothing sheet 2 by means of static electricity induction so as to plant the tissues 4 uniformly throughout the whole surface area of the basic clothing sheet 2 at regularly spaced-apart intervals, additionally to an advantage that one extremity of each tissue 4 is deeply pierced into the adhesive surface area layer of the basic clothing sheet 3, as definitely illustrated in FIG. 2(B) of the drawings.

A still further object of the invention is to provide a semi-leather fibrous tissue sheet product planted on the basic clothing sheet wherein, since the product is composed of said fibrous tissues planted to stickly and inseparably to easily come off by mere repetition of touching, polishing or cleaning frictions, a seeming and touching tone or so-called "the tone of slipperiness" of an animals' leather sheet product in the field of leather industry is reproducible to its full extent through the above-mentioned treating operations.

As has been clearly evident from the foregoing description, the semi-leather fibrous tissue sheet product of the present invention is uniformly planted on a basic clothing sheet throughout the whole outer surface area layer thereof in a stickly inseparable state, without causing sporadical density and parti-colour dyeing of the planted tissues so that when dyed, said fibrous tissues are seemingly quite equal to the natural color of an animal leather fibrous tissues, being far superior in strength and durability compared with a natural leather product sheet thereby to provide semi-leather fibrous tissue sheet product exceeding the existing similar one.

BRIEF DESCRIPTION OF INVENTION

DETAILED DESCRIPTION OF INVENTION

Figure 1A:
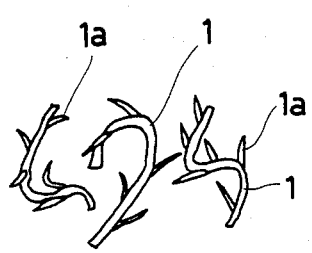
FIG. 1(a) is an enlarged cross section showing a few of the most representative leather fibrous tissues produced in accordance with the conventional methods.
Figure 1B:
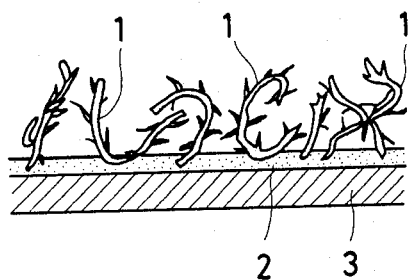
FIG. 1(B) is also an enlarged vertical cross section showing as to how the conventional leather fibrous tissues are planted on a basic clothing sheet.
Figure 2A:
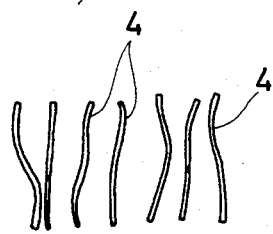
FIG. 2(A) is a cross sectional elevation showing, on an enlarged scale, a preferably embodied leather fibrous tissues to be planted on a basic clothing sheet in accordance with the present invention.
Figure 2B:
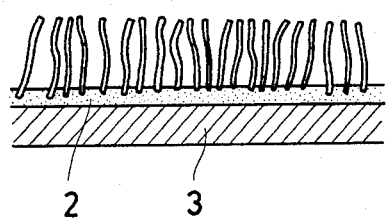
FIG. 2(B) is a vertical cross section showing as to how the leather fibrous tissues are inseparably stuck onto the outer surface area layer of a basic clothing sheet induced by means of static electricity.
Figure 3:
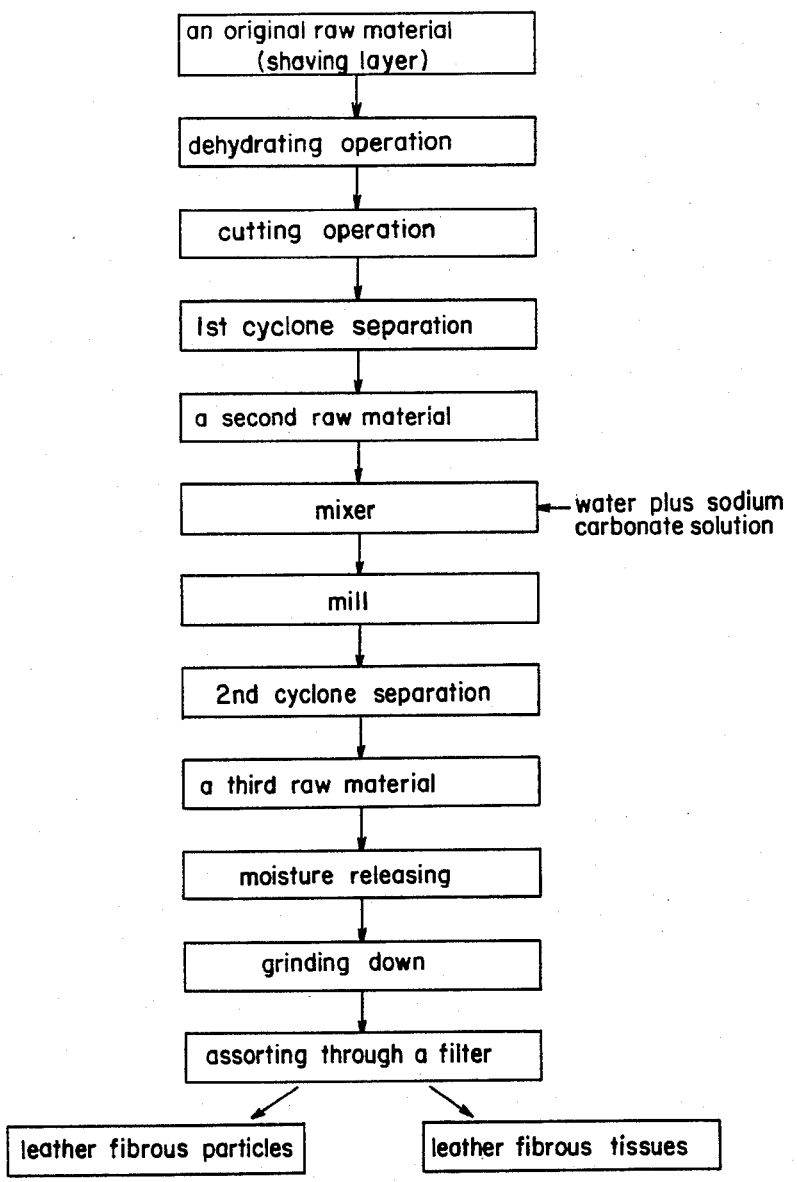
FIG. 3 is a flow chart explaining the processes through which the treating operations of raw materials are carried out in order.

Referring now in detail a preferred embodiment of the present invention in conjunction with the accompanying drawings, in which an original raw material in the form of odd flocks and other hackled pieces of an animal's leather is in the first instance dehydrated (at this stage, the raw material is called "a shaving layer") until the water content thereof is lowered approximately to the range between 20 and 40 percent by weight either by being exposed to natural and ambient drying conditions or by subjecting same to mechanical drying operations. Secondly, the original raw material thus dried is smashed into short length of pieces by means of a sharp blade-edge cutter, then said pieces being set to a cyclone separator through which to produce a second raw material. Thereafter the second raw material is taken out of the cyclone separator and put into a mixer wherein a proper quantity of water is added to the second raw material until the latter gets to water content of approximately 50 to 70 percent by weight by fully agitating both the material and the quantity of water together within the mixer. Simultaneously therewith, it is to be noted that to the percentage of water there is added a suitable quantity of sodium bicarbonate solution. The solution is adapted to uniformly readjust the irregularities of Ph of the second raw material lot thereby making it effective to carry on such treatments for example as enhances the effect of a dyeing operation that directly follows. Preferably, Ph of the second raw material lot is raised upto the range between Ph 6.5 and Ph 7.0.

After Ph density of the second raw material lot has been adjusted by permeating plenty of water thereinto in the above-mentioned manner, the same material is set to a mill whose rotational number is pre-set to less than 4000 rpm and smashed therein into shorter length of pieces until the latter pieces are ground down and finally formed into shapes of bundles or tissues of fibrous unit. In this case, a quantity of water added to the second raw material is fully permeated deep into each inside of the fiber elements and the fibrils both being component elements of leather fibrous tissue portions. Moreover, between each of the bundles and each of the fibers there exists so great a boundary space that the quantity of water serves to facilitate separation of these bundles and fibers from one another, whereas between each of the fiber elements and each of the fibrils there exists so small a boundary space that said quantity serves to facilitate adhering function of said elements sticking to the fibrils. To reiterate, said second raw material is easily separable into each state of bundles and fibers by being ground down within the mill. But on the contrary, the fiber elements and the fibrils are both prevented from being pulverized, thus there being neither bristling nor branching off in the midway of said elements and said fibrils, respectively.

The second raw material that has been treated in the above-mentioned manner is then taken out of the mill and further set to a cyclone separator thereafter being taken out of the cylone separator in the form of a third raw material.

The third raw material contains a large quantity of water when just taken out of the cyclone separator so that it must be left to be dried up in exposition to natural ambient drying conditions or otherwise forcibly dehydrated until the water content is lowered down to the range between 32 and 38 percent by weight. The third raw material thus naturally dried up or mechanically dehydrated is now in a state of solid lump so that the lump must be pulverized and the filtered through a filter to be assorted into quantities of powder having two different diameters by means of different mesh netting filters. Namely, a quantity of powder which passes through a filter having a netting between 30 and 100 meshes is assorted in the form of leather fibrous tissues capable of adhering to a basic clothing sheet inducibly by means of static electricity whereas another quantity which passes through a filter having a netting more than 100 meshes is assorted in the form of leather fibrous powder.

Our accepted result of leather fibrous tissue manufacturing operations in factory proves that the amount of the tissues employable as a static electricity inducible raw material is approximately 50 percent while the amount of a little more than 30 percent of the remain is employable as leather fibrous powder.

It is clearly understood from the preceding description of the invention that the leather fibrous tissues embodying the invention provides a semi-leather fibrous tissue sheet product which can be almost prevented from being bent in excess, without occurence of bristling and branching-off phenomena so that by using the raw material of the invention, high quality semi-leather fibrous tissue sheet products can be obtained that are uniformly and inseparably attached on the whole outer surface area of a basic clothing sheet, subsequently making it possible to provide any kinds of semi-leather fibrous tissue sheet products quite equal to those made of animals' leather itself from viewpoints of appearance and touching sense.

What is claimed is:

1. A method of producing a sheet having leather fibrous tissues adhered thereto, comprising the steps of
   dehydrating animal leather scraps in the form of original first raw material until water content thereof is lowered to the range between 20 to 40 percent by weight;
   cutting a dehydrated amount of said leather scraps into short lengths by means of a cutter having sharp blade edges, thereby to obtain a second raw material;
   adding water to said second raw material while agitating said second material;
   setting an agitated amount of said second raw material to a mill and milling said second raw material until said agitated second material is substantially completely turned into a fibrous state, thereby to obtain a third raw material;
   dehydrating an amount of said third raw material until water content thereof is lowered to less than 40 percent by weight;
   smashing a dehydrated amount of said third raw material into substantially shorter lengths;
   filtering a smashed amount of said third raw material into assortment; and
   adhering said filtered third raw material onto said sheet.

2. The method of claim 1, wherein said leather fibrous tissues are adhered onto a woven clothing sheet and finished by a baffing treatment.

3. The method of claim 1, wherein said leather fibrous tissues are adhered on an unwoven clothing sheet and finished by a baffing treatment.

4. A sheet of material having leather fibers attached thereto produced by the method of claim 1.

5. A sheet of material having leather fibers attached thereto produced by the method of claim 2.

6. A sheet of material having leather fibers attached thereto produced by the method of claim 3.

* * * * *